United States Patent
Nelson

(10) Patent No.: US 6,177,173 B1
(45) Date of Patent: Jan. 23, 2001

(54) DAMPED LAMINATES HAVING WELDED THROUGH HOLES AND/OR EDGES WITH DECREASED SPRING BACK AND IMPROVED FASTENER FORCE RETENTION AND, A METHOD OF MAKING

(75) Inventor: A. Dwayne Nelson, Stillwater, MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/108,616

(22) Filed: Jul. 1, 1998

(51) Int. Cl.[7] .............................. B32B 3/24; B32B 15/08
(52) U.S. Cl. ........................ 428/137; 428/68; 428/71; 428/75; 360/97.01; 360/97.02; 181/207; 181/208; 156/253; 156/256; 156/261; 156/250; 156/308.4; 228/174; 228/170
(58) Field of Search ............................ 428/137, 68, 71, 428/75; 181/207, 208; 360/97.01, 97.02; 228/174, 170; 156/253, 256, 261, 250, 308.4

(56) References Cited

U.S. PATENT DOCUMENTS

| | | | |
|---|---|---|---|
| 5,183,863 | 2/1993 | Nakamura et al. | 525/438 |
| 5,262,232 | 11/1993 | Wilfong et al. | 428/327 |
| 5,271,142 | * 12/1993 | Moore, III et al. | 29/469.5 |
| 5,308,887 | 5/1994 | Ko et al. | 522/148 |
| 5,367,418 | 11/1994 | Chessman et al. | 360/99.12 |
| 5,538,774 | 7/1996 | Landin et al. | 428/64.1 |
| 5,590,004 | 12/1996 | Boutaghou | 360/99.12 |
| 5,663,851 | 9/1997 | Jeong et al. | 360/98.08 |
| 5,691,037 | 11/1997 | McCutcheon et al. | 428/172 |

FOREIGN PATENT DOCUMENTS

| | | |
|---|---|---|
| 0 493 123 A1 | 7/1992 | (EP) . |
| 0 633 132 A1 | 1/1995 | (EP) . |
| 2 064 426 | 6/1981 | (GB) . |
| 2 113 605 | 8/1983 | (GB) . |

OTHER PUBLICATIONS

PCX–9 Polycore Composites® Physical Properties Sheet, Pre Finish Metals Inc., Polycore Composites®, Elk Grove Village, Illinois.

*Ulmann's Encyclopedia of Industrial Chemistry*, 5th Edition, vol. A 28, Barbara Elvers and Stephen Hawkins, Editors, pp. 203 to 227, 1996.

*The Handbook of Metal Forming*, Kurt Lange, Editor, (McGraw–Hill Book Company), ISBN 0–07–036285–8, Preface, Table of Contents and ISBN number only).

* cited by examiner

*Primary Examiner*—William P. Watkins, III

(57) ABSTRACT

The present invention relates to vibration damped laminate articles having improved force (torque and/or pressure and/or stress) retention and decreased or eliminated spring back. An area defining a through hole and/or the periphery of the article is welded. Methods of making the articles and fastening assemblies including the articles are provided.

31 Claims, 4 Drawing Sheets

DAMPED LAMINATES HAVING WELDED THROUGH HOLES AND/OR EDGES WITH DECREASED SPRING BACK AND IMPROVED FASTENER FORCE RETENTION AND, A METHOD OF MAKING

FIELD OF THE INVENTION

The present invention relates to vibration damped laminate articles having improved force (torque and/or pressure and/or stress) retention, decreased or eliminated potential for spring back, methods of making the articles and fastening assemblies. An attachment device, such as a screw or clamp, that provides a mechanical force to hold a laminate article of the invention in a location has improved force retention compared to systems using known laminates.

BACKGROUND OF THE INVENTION

Periodic or random vibrations or shocks can excite the resonant frequencies in various structures, such as disk drive covers, disk drive bases, automobile oil pans, valve covers, etc., which can be problematic due to the resultant formation of undesirable stresses, displacements, fatigue, and even sound radiation or high levels of sound transmission. In addition, these various components (disk drive covers, automobile valve covers, etc.) may also be used as part of an enclosure to prevent acoustical noise from transmitting through the enclosure and are designed to reduce the level of noise passing through. Such undesirable vibrations, shocks or noise sources are typically induced by external or internal forces or noise generators and can be experienced by a wide variety of articles and under a variety of conditions. For example, resonant vibrations can cause significant levels of acoustical noise in a disk drive assembly. This noise can be easily transmittable through a typical monolithic material cover or base casting of the disk drive allowing excessive noise to pass through the material which is undesirable to the operator of the disk drive. The resonant vibrations in the cover or base may also lead to excessive vertical or horizontal displacement of the key mechanical attachment points in the disk drive leading to poor overall disk drive performance and even potential reliability problems. Control of the resonant vibrations and shock in a disk drive are key to optimum performance in the read/write process and quiet operation plus high disk drive reliability.

The preferred known method to reduce resonant vibrations, shock effects and noise transmission or generation is by using viscoelastic damping materials in a design. The viscoelastic damping materials will dissipate the vibrational energy generated by the resonant vibrations thus reducing the negative effects of the excitation source. The viscoelastic materials when used in a design can also reduce the transmitted or generated noise in an article. The viscoelastic materials can be used as an add-on item to the article or more optimally as an inner layer of a laminate structure used to make the article.

One of the largest uses of viscoelastic laminates is in the automobile industry for oil pans, valve covers, and other viscoelastic laminate formed parts or panels. The laminates in these applications offer significant reductions in the acoustical noise transmission and generation escaping from the engine and also reduce the acoustical noise that can enter the passenger compartment in addition to reducing the resonant frequency amplitudes in the articles. These laminates typically have an attachment area by which the laminate part is attached to a base, housing or other structure. The method of attachment of the laminates could be by screws, bolts, nails, rivets, clamps, or other mechanical attachment devices.

One potential problematic area in using the viscoelastic laminates is in the attachment of the laminates. The viscoelastic damping material will stress relax following attachment of the laminate(s) to the structure or base using the screws, bolts, nails, rivets, clamps or other mechanical attachment devices. The attachment devices are used to securely hold the laminates in a specific alignment and under a specific stress or pressure or torque or fastening force. The torque, pressure, stress, or fastening force will tend to relax somewhat normally even in non-laminate structures due to stress relaxation in the fastener material, substrate material, or fastener attachment point to the structure. Thus, in a laminated article, stress relaxation occurs in the fastening system, the laminate, and also to a smaller degree the higher modulus layers of the laminate. The dominate area of stress relaxation is typically the viscoelastic material part of the laminate. Furthermore, variations in temperature above the application temperature of the laminate using the attachments devices can allow the attachment system to stress relax in a shorter period of time.

The stress, torque, pressure, or fastening force in the attachment device prevents the attachment device from loosening during use of the structure the laminate is attached to. If the attachment device is allowed to fall below a critical attachment force, the laminate could become loose allowing the laminate to shift from the desired location. The loose laminate could interfere with other items near it and/or induce misalignment in items attached to the laminate. Furthermore, the fastener devices could loosen to the point where they would no longer support the laminate in a proper alignment leading to a catastrophic failure of the unit to which the laminate is attached.

Methods that have been used to prevent failure of the attachment of the laminate due to the stress relaxation in the viscoelastic layer are discussed below. Certain methods can add cost, processing time, design complexity, etc., or combinations of each which may not be desirable. Operations or designs to reduce the viscoelastic layers stress relaxation after application of the fastener device include those which are disclosed in PCX-9 POLYCORE COMPOSITES® Physical Properties Sheet, Pre Finish Metals Inc., Polycore Composites®, Elk Grove Village, Ill., such as:

1) The use of automatic Bolt Torque equipment should allow for the entire laminate construction. This fastener attachment method provides for an increased attachment force (torque or pressure) (as compared to a non-laminate material) via the attachment device to the laminate in the attachment area such that after the damping material layer stress relaxes the minimum force required for the application is maintained. The increased torque required initially when attaching the cover to achieve the minimum torque in the screw following stress relaxation can exceed the strength of the screw head-shaft interface, the screw head features (Phillips, Torx, slotted, etc.) that the driver uses to engage the screw and through which the force is applied. In addition, the screw hole tapping or screw features can be stripped in the base or combinations thereof.

2) Another method involves use of a thin input viscoelastic layer in the construction of the laminate to lessen the amount the viscoelastic layer can stress relax. (PCX-9 discloses a layer which is only 0.0254 mm (0.001") thick.) This approach is undesirable as the optimum design of the laminate viscoelastic thickness to reduce resonant vibrations (and reduce acoustical noise generated or transmission) may not be the optimum for the viscoelastic layer thickness in regard to force retention after viscoelastic relaxation.

3) Another method involves retorquing or applying a secondary (or more) re-application of attachment force once the viscoelastic layer has stress relaxed to achieve the desired attachment force. This method is disadvantageous in that it adds cost to the attachment process and is not acceptable in most applications, especially high volume applications where added work in process or secondary operations can significantly increase manufacturing costs.

4) Another method involves the application of heat to the laminate during the attachment device application process. This method to reduce stress relaxation is disadvantageous in that the use of heat during the laminate article attachment is often not practical for a manufacturing process as it will add cost, application complexity, safety concerns if the temperature required is high, and difficulty in monitoring the process. In addition, components, fluids or electronics near the laminate may not allow for the use of heat in the application of the laminate.

5) Another method involves compression of the viscoelastic layer around the area to be torqued during stamping of the laminate. This method of compression may not provide adequate torque retention in all applications.

McCutcheon, et al. U.S. Pat. No. 5,691,037 describes vibration damped laminate articles having improved force (torque and/or pressure and/or stress) retention, a method of making one article type and novel tools used to make the one article type. The first laminate article comprises at least one layer of damping material between at least two substrate layers. At least one deformation area is present in the laminate article wherein the substrate(s) are plastically deformed such that they are closer than non-deformed areas of the substrate and wherein the damping material has less mass than in a non-deformed area of the article; the deformation areas providing the areas of good force retention, for an attachment device attached thereto. The second laminate article, which is not deformed, contains an additive of sufficient modulus, diameter and loading, in a vibration damping layer to provide improved force retention.

SUMMARY OF THE INVENTION

Laminate articles are frequently prepared by a procedure involving first preparing a laminate from the desired substrate outer layers and internal vibration damping material layer and subsequently stamping out laminate articles of the desired shape. If the stamping mechanism is functioning properly the substrates are typically aligned in parallel fashion in the stamped article. However, if the mechanism is not functioning as desired, the laminate article which is stamped out may appear to have substrate layers which are properly aligned in a parallel fashion but which in actuality are not. The internal vibration damping material may actually hold the substrates in a parallel alignment for a period of time but afterwards the substrate layers can separate to their true alignment. (This is referred to as spring back). This can be a problem if the substrate layers are out of parallel alignment by as little as one degree.

Unfortunately a period of days or more may elapse before this spring back problem is noticed. The stamping mechanism can then be adjusted to try to overcome the alignment problems in future production runs. However, laminate articles that appear to be correctly aligned but which are actually not, may have been shipped to a customer, etc. Thus the spring back of the substrate layers of the articles can occur, for example, after a customer has received the articles. Since it is not visually apparent from observing a laminate article if it is properly aligned it would be advantageous to provide an article in which one is sure this spring back will not occur or occur only minimally in order to decrease the possibility of shipping defective product to a customer, etc.

Regardless of correct alignment of the laminate layers and the potential for spring back, a laminate article can also experience problems with fastener force retention due to the tendency of an attachment device to compress the laminate layers together of a laminate article which is not modified as described according to the present invention, but subsequently loosen after a period of time has elapsed.

Thus, new types of laminate articles which have improved fastener force retention and a method of making are desirable. Also desirable are laminate articles having minimal or no spring back.

We have discovered such articles and methods. The present invention relates to laminate articles with improved force retention, decreased or non-existent potential for spring back, as well as methods of making the articles. The laminate articles of the invention provide fastening systems having improved force retention. The present invention relates to a method of improving the force retention properties of a laminate structure by welding through hole(s) and/or welding the periphery of the laminate which in turn reduces the torque lost in a retention device following attachment or assembly of the laminate article into a structure with the attachment device. The method further provides a laminate article which minimizes the force required to compress the substrate layers together due to a residual spring effect between substrate layer(s) and can allow reduced dynamic friction in some fastener devices.

More specifically, the present invention provides laminate articles designed to reduce or eliminate the spring effect, prevent damping material movement, and prevent stress relaxation of the force load under the fastener device, to provide for laminate articles with more fastener force retention after a given period of time and temperature as compared to similar laminate articles not employing the welds of the invention.

The present invention provides a first damped laminate article which minimizes or overcomes any potential spring back problems and which provides improved force retention in attachment area(s) which are in the vicinity of a through hole upon application to a second article which may be a base, housing, etc., with an attachment device such as a screw, bolt, rivet, etc.

The first laminate article of the invention comprises:
  a first substrate layer and a second substrate layer;
  at least one layer of vibration damping material comprising a viscoelastic material positioned between said first and second substrate layers;
    optionally one or more additional substrate layers positioned between said first and second substrate layers;
    optionally one or more bonding material layers bonded between a substrate layer and a vibration damping layer, wherein the storage modulus of each bonding material layer is higher than the storage modulus of the viscoelastic material contained in a vibration damping layer to which it is bonded;
    wherein the storage modulus of each substrate layer is greater than that of the viscoelastic material in any vibration damping material layer with which it is in contact;

wherein the laminate article has at least one through hole extending completely therethrough, wherein an area of the article which defines at least one through hole is welded via weld(s) such that the first substrate layer is welded to the second substrate layer.

Optionally, with respect to the first laminate article, at least a portion of the laminate periphery may be welded such that the first substrate layer is welded to the second substrate layer via weld(s).

In a preferred embodiment, the areas of the articles which define more than one through hole (more preferably each through hole) is welded via weld(s) such that the first substrate layer is welded to the second substrate layer.

In a preferred embodiment is the laminate article wherein for at least one through hole the through hole has a circumference, wherein each weld has a length, and wherein the area defining the through hole is welded such that the total length(s) of the weld(s) is about 50 to about 100 percent (preferably about 75 to about 100 percent, most preferably about 100 percent) of the length of the circumference of the through hole.

A preferred embodiment is the laminate article wherein for at least one through hole more than one weld is present in an area defining the through hole and wherein the welds are symmetrically positioned about the area defining the through hole.

A preferred embodiment is the laminate article wherein for at least one through hole which has the area of the article defining the through hole welded, the through hole has a diameter of about 0.12 cm to about 3.5 cm.

A preferred embodiment is the laminate article wherein each through hole has a diameter of about 1 mm to about 10 mm.

The invention also relates to methods by which the above described first laminate article of the invention is made. The present invention provides a first method of improving the force retention of a damped laminate article by welding around the area of the laminate defining a through hole.

The method of preparing the above described first laminate article comprises the steps of:

(a) preparing a laminate comprising at least one layer of vibration damping material, the vibration damping material comprising a viscoelastic material, wherein the vibration damping material is positioned between a first substrate layer and a second substrate layer, and optionally one or more additional substrate layers positioned between said first and second substrate layers wherein each substrate layer has a higher storage modulus than the viscoelastic material in any vibration damping material layer with which it is in contact, optionally one or more bonding material layers bonded between a substrate layer and a vibration damping layer, wherein the storage modulus of each bonding material layer is higher than the storage modulus of the viscoelastic material contained in a vibration damping layer to which it is bonded; and (b) providing at least one through hole in the laminate article;

(c) welding an area of the laminate defining at least one through hole, such that the first substrate layer is welded to the second substrate layer via weld(s), wherein force is optionally applied to a laminate during welding such that the layers of the laminate are in a desired position.

In a preferred embodiment the method of preparing the first laminate article of the invention comprises the steps of:

(a) preparing a laminate comprising at least one layer of vibration damping material, the vibration damping material comprising a viscoelastic material, wherein the vibration damping material is positioned between a first substrate layer and a second substrate layer, and optionally one or more additional substrate layers positioned between said first and second substrate layers wherein each substrate layer has a higher storage modulus than the viscoelastic material in any vibration damping material layer with which it is in contact, optionally one or more bonding material layers bonded between a substrate layer and a vibration damping layer, wherein the storage modulus of each bonding material layer is higher than the storage modulus of the viscoelastic material contained in a vibration damping layer to which it is bonded; and (b) stamping a laminate article out of the laminate wherein the laminate article has at least one through hole therein;

(c) welding an area of the laminate defining at least one through hole, such that the first substrate layer is welded to the second substrate layer via weld(s), wherein force is applied to the laminate during welding such that the substrate layers are in a parallel position. (This force may be applied by a clamp, for example).

The present invention also provides a second damped laminate article having decreased or non-existent spring back and improved force retention particularly in area around the periphery of the article where weld(s) are present upon application to a second article which may be a base, housing, etc., with an attachment device such as a screw, bolt, rivet, etc.

The present invention provides a second laminate article comprising:

a first substrate layer and a second substrate layer;

at least one layer of vibration damping material comprising a viscoelastic material positioned between said first and second substrate layers;

optionally one or more additional substrate layers positioned between said first and second substrate layers;

optionally one or more bonding material layers bonded between a substrate layer and a vibration damping layer, wherein the storage modulus of each bonding material layer is higher than the storage modulus of the viscoelastic material contained in a vibration damping layer to which it is bonded;

wherein the storage modulus of each substrate layer is greater than that of the viscoelastic material in any vibration damping material layer with which it is in contact;

wherein at least a portion of the laminate article periphery is welded via weld(s) such that the first substrate layer is welded to the second substrate layer.

The above second laminate article may optionally have one or more through holes therein, wherein the area of the laminate defining at least one through hole (preferably more than one through hole, more preferably each through hole) may optionally be welded.

In a preferred laminate article embodiment the welds are spaced about the laminate article periphery, such that the distance between adjacent welds is about 10 cm or less (preferably about 1 cm or less).

In a preferred laminate article embodiment the laminate has corners, each corner having an apex and the laminate is welded such that within at least about 2.5 cm of the apex (more preferably at the apex) of each corner there is a weld.

With respect to the laminates of the invention preferably the bonding material layer is selected from the group consisting of epoxy resins and cyanoacrylates, polyamides, acrylics, phenoxies, and phenolics.

Preferably a laminate article of the invention has at least one layer of vibration damping material contained therein, said vibration damping material comprising a viscoelastic material, said vibration damping material having a loss factor of at least about 0.01 and a storage modulus of at least about $6.9 \times 10^3$ Pascals.

Preferably with respect to a laminate article of the invention the vibration damping material is a viscoelastic material selected from the group consisting of thermoplastic polymers, thermosetting polymers (more preferably acrylate), and mixtures thereof.

In one embodiment of the laminate articles of the invention the article contains at least two layers of vibration damping material and at least three substrate layers.

In one embodiment at least one vibration damping material layer further comprises an additive selected from the group consisting of fibers, particulates, and mixtures thereof.

In a preferred embodiment the vibration damping of the laminate articles of the invention is improved by at least about 10% in at least 1 vibrational mode.

In one embodiment of the laminate article of the invention the vibration damping layer is a continuous layer.

In one embodiment of the laminate article of the invention the vibration damping layer is a continuous layer made up of adjacent sections of different vibration damping materials.

In one embodiment of the laminate article of the invention the article contains at least 2 layers of vibration damping material, wherein at least 2 of the layers comprise different damping materials.

In one embodiment of the laminate article of the invention the vibration damping layer is a discontinuous layer. Optionally the discontinuous layer comprises sections of damping material separated by non-damping material or spaces.

The invention also relates to the method by which the second laminate article of the invention is made. The present invention provides a method of decreasing spring back improving the force retention of a damped laminate article by welding at least partially around the periphery of the laminate article.

The method of preparing the second laminate article of the invention comprises the steps of (a) preparing a laminate article comprising at least one layer of vibration damping material, the vibration damping material comprising a viscoelastic material, wherein the vibration damping material is positioned between a first substrate layer and a second substrate layer, and optionally one or more additional substrate layers positioned between said first and second substrate layers wherein each substrate layer has a higher storage modulus than the viscoelastic material in any vibration damping material layer with which it is in contact, optionally one or more bonding material layers bonded between a substrate layer and a vibration damping layer, wherein the storage modulus of each bonding material layer is higher than the storage modulus of the viscoelastic material contained in a vibration damping layer to which it is bonded; and (b) welding at least a portion of the laminate article periphery such that the first substrate is welded to the second substrate via weld(s), wherein force is optionally applied to the laminate during welding such that the layers of the laminate are in a desired position.

In a preferred embodiment the method of preparing the second laminate article of the invention comprises the steps of:

(a) preparing a laminate comprising at least one layer of vibration damping material, the vibration damping material comprising a viscoelastic material, wherein the vibration damping material is positioned between a first substrate layer and a second substrate layer, and optionally one or more additional substrate layers positioned between said first and second substrate layers wherein each substrate layer has a higher storage modulus than the viscoelastic material in any vibration damping material layer with which it is in contact, optionally one or more bonding material layers bonded between a substrate layer and a vibration damping layer, wherein the storage modulus of each bonding material layer is higher than the storage modulus of the viscoelastic material contained in a vibration damping layer to which it is bonded; and (b) stamping a laminate article out of the laminate;

(c) welding at least a portion of the laminate article periphery such that the first substrate is welded to the second substrate via weld(s), wherein force is applied to the laminate during welding such that the substrate layers are in a parallel position. (This force may be applied by a clamp, for example).

The present invention also provides a fastening assembly comprising a laminate article of the invention and at least one attachment device positioned thereon, wherein at least one attachment device at least partially contacts a weld.

The present invention also provides a fastening assembly comprising a laminate article of the invention and at least one attachment device positioned thereon, wherein at least one attachment device at least partially contacts at least one of the welded areas of the article surrounding at least one through hole.

In a preferred embodiment the attachment device is inserted through the through hole.

The present invention also provides fastened assembly comprising a laminate article of the invention fastened to a second article via an attachment device, wherein at least one attachment device at least partially contacts a weld.

DEFINITION OF TERMS

Figure 1:
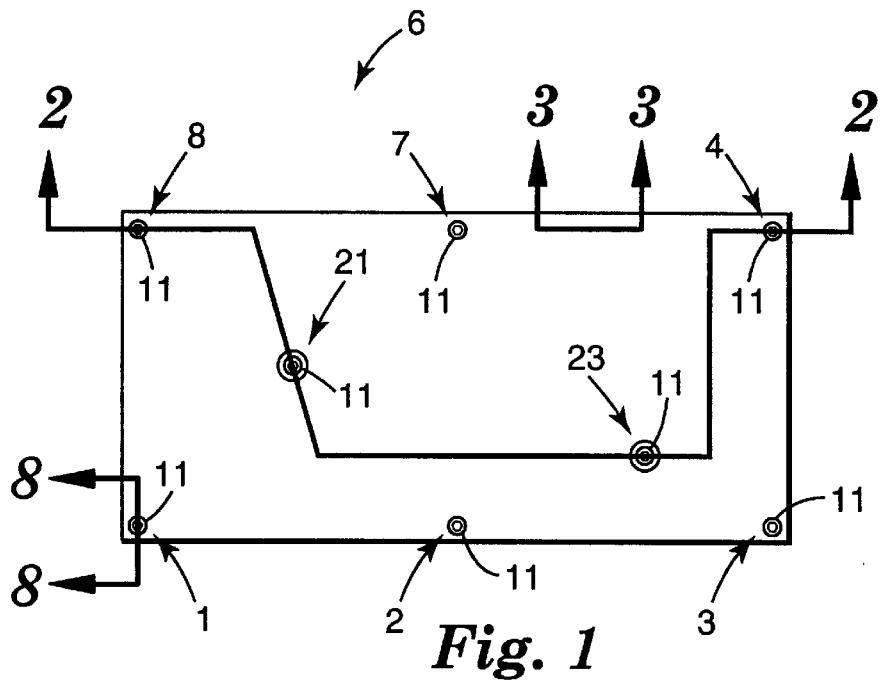
FIG. 1 is a top view of a disk drive, showing a laminate article of the invention which is a disk drive cover.

The term "attachment device, "fastener device", and "retention device" are used interchangeably herein to refer to items such as screws, bolts, clamps, nails, rivets, integrally molded attachment devices, and other mechanical attachment devices that can hold the laminate in a desired location, position, attitude or configuration with a desired level of force.

The term "attachment area" as used herein describes the area in which an attachment device may contact the laminate and impart the force that is used to hold the laminate in a position, location, attitude, or configuration. An example of an "attachment area" would be the area under the head of a screw, for example; the "attachment area" being defined to extend through the entire laminate.

The term "residual spring effect" and "residual spring force" are used interchangeably herein to refer to the spring type potential resistive force that exists between two or more substrate layers of a laminate that have a separation between them. This separation will require the attachment force of the attachment device to overcome the residual spring force during attachment device application.

The terms "damped laminate" and "laminate" are used interchangeably herein to refer to a construction comprising at least two substrate layers and at least one layer of a vibration damping material comprising a viscoelastic material that has a lower storage modulus than the substrate layers it is positioned between.

The substrate layers for a typical article construction include but are not limited to materials such as stainless steel, aluminum, copper, carbon steel, lead, and various other materials which typically have a Young's modulus greater than about $5 \times 10^5$ psi ($34.5 \times 10^8$ Pascals) at least somewhere in the operating temperature of about $-29°$ C. to $316°$ C. ($-20°$ F. to $600°$ F.). The vibration damping layer has a storage modulus of typically less than about $1 \times 10^5$ psi ($6.9 \times 10^8$ Pascals) at the temperature of the application. The laminate can also be of a multiple layer construction that may have more than two substrate layers and also more than one vibration damping material layer. The construction could also have vibration damping layers adjacent to each other in layers or stripes or other patterns. The damping layers may also be continuous or discontinuous.

The terms "plastically deformed" and "plastic deformation" are used herein to describe the permanent change to the laminate's shape or profile or contour or features that occurs when the substrate layer(s) are exposed to a force or strain (typically from a punch tool and the tool's working surfaces) that imparts a force into the material that exceeds its yield strength.

The term "substrate contact surface" as used herein refers to the surface area(s) of the laminate that the attachment device comes in contact with upon application and imparts the attachment device's force upon the laminate.

A "through hole" as used herein refers to a hole that passes completely through the article.

DETAILED DESCRIPTION OF THE INVENTION

The first step in preparing an article of the invention typically involves preparing a damped laminate. A damped laminate is typically prepared by incorporating one or more layers of a vibration damping material into the laminate article typically by adding one layer or a plurality of layers of a vibration damping material during the manufacture of the article as an inner layer(s). The vibration damping material layer(s) may be continuous or discontinuous. The discontinuous layer may be separated by space(s) and/or a nondamping material. A continuous layer may comprise the same damping material or different damping materials adjacent to each other, thereby forming a continuous surface. When two or more layers are present the layers may comprise the same or different damping material and each may be continuous or discontinuous.

Vibration Damping Material

The vibration damping material includes a viscoelastic material or combination of different viscoelastic materials. Typical viscoelastic materials are those having a storage modulus of at least about 1.0 psi ($6.9 \times 10^3$ Pascals) and a loss factor of at least about 0.01, at the temperature and frequency of use. Preferably the viscoelastic materials have the aforementioned storage modulus over at least one temperature and frequency with in the aforementioned temperature and frequency range, most preferably over the entire temperature and frequency range. Advantageously and preferably, a layer(s) of the vibration damping material is placed in areas of high strain energy as an inner layer(s) to provide improved damping in the desired frequency and temperature range. The added damping layer(s) should increase the vibrational damping, as measured by the system loss factor, of the article or the structural material of which it is made, by at least about 10 percent in at least one vibrational mode as compared to a non-laminate construction.

A viscoelastic material is one that is viscous, and therefore capable of dissipating energy, yet exhibits certain elastic properties, and therefore capable of storing energy. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Typical viscoelastic materials for use in the vibration damping materials of the present invention have a storage modulus, i.e., measure of the energy stored during deformation, of at least about 1.0 psi ($6.9 \times 10^3$ Pascals) at the frequency and temperature of operation. The storage modulus of viscoelastic materials may be as high as 500,000 psi ($3.45 \times 10^9$ Pascals), for example; however, typically it is about 10–2000 psi ($6.9 \times 10^4$ –$1.4 \times 10^7$ Pascals).

Suitable viscoelastic materials for use in the vibration damping materials of the present invention have a loss factor, i.e., the ratio of energy loss to energy stored, of at least about 0.01. Preferably the loss factor is at least about 0.1, more preferably about 0.5–10, and most preferably about 1–10, in the frequency and temperature range where damping is required (typically about 1–10,000 Hz and about $-29°$ C. to about $260°$ C. (about $-20°$ F. to about $500°$ F.). For example, the loss factor at the temperature falling at least somewhere within the range of 20–25 degrees C. at 10 Hz is preferably about 0.1 to about 3, more preferably about 0.25 to about 1.6. This loss factor is a measure of the material's ability to dissipate energy and depends on the frequency and temperature experienced by the damping material. For example, for a crosslinked acrylic polymer, at a frequency of 100 Hz, the loss factor at $68°$ F. ($20°$ C.) is about 1.0, while at $158°$ F. ($70°$ C.) the loss factor is about 0.7.

Preferred viscoelastic materials are those that remain functional over a wide range of temperatures, e.g., about −40° C. to about 300° C. Most preferred viscoelastic materials are those that cover the broadest temperature and frequency range at the desired minimum loss factor and storage modulus to achieve acceptable damping of the viscoelastic laminate article, and do not experience a significant degradation in properties due to long times at high temperatures or short excursions beyond these high temperature levels.

The properties described herein which can apply to viscoelastic material also preferably apply to vibration damping materials.

Useful viscoelastic damping materials can be isotropic as well as anisotropic materials, particularly with respect to its elastic properties. As used herein, an "anisotropic material" or "nonisotropic material" is one in which the properties are dependent upon the direction of measurement. Suitable viscoelastic materials include urethane rubbers, silicone rubbers, nitrile rubbers, butyl rubbers, acrylic rubbers, natural rubbers, styrene-butadiene rubbers, and the like. Other useful damping viscoelastic materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Specific examples of useful materials are disclosed or referenced in U.S. Pat. No. 5,183,863 (issued Feb. 2, 1993), U.S. Pat. No. 5,262,232 (issued Nov. 16, 1993) and U.S. Pat. No. 5,308,887 (issued May 3, 1994), all of which are incorporated herein by reference.

Examples of thermoplastic materials suitable for use as the vibration damping material in viscoelastic laminate articles according to the present invention include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, and combinations thereof.

Useful viscoelastic materials can also be crosslinkable to enhance their strength and/or temperature resistance. Such viscoelastics are classified as thermosetting resins. When the viscoelastic material is a thermosetting resin, then prior to the manufacture of the viscoelastic laminate article the thermosetting resin is in a thermoplastic state. During the manufacturing process, the thermosetting resin is cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) the curing agent initiates the polymerization of the thermosetting resin. Particularly preferred viscoelastic damping materials are those based on acrylates.

The desired thickness of the damping material in the laminate of the invention is typically about 0.002 mm to about 1.5 mm; preferably, about 0.02 mm to about 1 mm; and most preferably, about 0.02 mm to about 0.25 mm. Typically, the thickness of the damping material is about 0.5 to about 50% of the thickness of the laminate, and more typically about 1 to about 25%. The article of the invention typically contains at least 1 damping layer, more typically 1–3 layers, preferably 1–2, most preferably 1 for reasons of simplicity of the article's manufacturing process and cost. Stiffness may also be sacrificed when more than 1 damping layer is included. However, a wider temperature range of damping is possible when multiple layers of different vibration damping materials are included. Sufficient damping material should be used to obtain the desired damping effect while balancing the structural requirements of the article. The vibration damping layer may be continuous or discontinuous.

Vibration Damping Material Additives

The vibration damping material of the present invention may optionally further comprise an effective amount of a metal, fiberglass, glass, ceramic, and/or organic (such as polyesters, polyamides, epoxy resins, etc.) fibrous and/or particulate material. The inclusion of fibrous and/or particulate material in certain laminate articles is described in McCutcheon et al, U.S. Pat. No. 5,691,037. (Optionally, the fibrous and/or particulate material can be thermally conductive, electrically conductive, or both. Herein, an "effective amount" of a fibrous material and/or particulate is an amount sufficient to impart at least improvement in desirable characteristics to the viscoelastic material, but not so much as to give rise to any significant detrimental effect on the structural integrity of the article in which the viscoelastic material is incorporated. Generally, the fibrous or particulate material is used in an amount effective to increase the strain energy ratio of a component containing the same amount and type of viscoelastic material without the fibrous or particulate material. Generally, an increase in the strain energy ratio of a factor of at least about two in at least one vibrational mode is desired. Typically, the amount of the fibrous material in the viscoelastic material is within a range of about 3–60 wt. percent, preferably about 10–50 wt. percent, more preferably about 15–45 wt. percent, and most preferably about 20–40 wt. percent, based on the total weight of the vibration damping material. Typically, the amount of the particulate material in the viscoelastic material is within a range of about 0.5–70 wt. percent, preferably about 1–45 wt. percent, more preferably about 5–40 wt. percent, and most preferably about 5–30 wt. percent, based on the total weight of the vibration damping material.

Epoxy Resin

The vibration damping material that provides the significant portion of the damping for a given material layer may also include an effective amount of an epoxy resin (with or without the previously mentioned particulate or fibrous material) dispersed within the damping material. The vibration damping material may include an amount of epoxy resin effective to improve the mechanical integrity of the viscoelastic laminate article. The epoxy resin material may have damping properties. An example of a suitable damping material incorporating an epoxy resin is disclosed in U.S. Pat. No. 5,262,232 (issued Nov. 13, 1993), incorporated herein by reference. Typically, the amount of epoxy resin incorporated into the vibration damping material would be about 0.5 to 95 weight percent, more typically about 5 to about 50 weight percent, based on the total weight of the vibration damping material.

Substrate Layers

A substrate may, for example, be selected from the group consisting of metals and plastics. Examples of suitable substrates include but are not limited to those selected from the group consisting of stainless steel and its alloys, aluminum and its alloys, copper, carbon steel, lead, polyethylenes, polyolefins, polycarbonates, polystyrenes, polyimides, polyesters, polyacetates, vinyl copolymers, polyacetals, and phenolics. The substrate layers may optionally be coated with a coating such as paint, etc.

Optional Laminate Layers

A laminate article of the invention optionally further comprises additional layer(s) besides the substrate and vibration damping layers. The article may optionally further comprise a bonding material layer(s), for example. The bonding material layer(s) may be bonded between a substrate layer and a vibration damping layer(s), wherein the storage modulus of each bonding material layer is optionally higher than that of the vibration damping layer to which it is bonded. Examples of useful bonding layers include but are not limited to those selected from the group consisting of epoxy resins and cyanoacrylates. Preferably, the storage modulus of the bonding material layer is less than that of a substrate to which it is bonded.

Welds

The welds are important in that they can minimize or prevent any potential spring back of the laminate substrate layers. This can be important when the laminate article is cleaned ultrasonically. If spring back has occurred liquid can seep into the space between the substrate and the damping material and squirt out when, for example, an attachment device is later applied to the laminate. The welds are also important in that they improve the force retention in the attachment device. The welds provide a high modulus mechanical force connection around the damping material and to the substrate layers, in effect, bypassing or bridging the damping material and creating a mechanical connection that can support the attachment device's force with stress relaxation less than that of the damping material. When a fastener device is applied, the force between substrate layers can pass through the welds that connect the substrate surfaces to provide reduced-viscoelastic stress relaxation as the damping material is mechanically bypassed in the region of the weld. The welds can be used to optimize fastener device force retention, without reducing the damped article's effectiveness as a damping system.

Welding can occur with or without using a welding material. Welding done without using a welding material is referred to as "spot welding". Preferably spot welding is employed so as to have a minimal affect on the laminate dimensions. A welding material, if used should be selected such that it is capable of welding the substrates together. It should be compatible with the damping material and substrate layers. The welding temperature should be selected so as to minimize the damage to the vibration damping material and substrate layers. Examples of suitable welding materials include but are not limited to those selected from the group consisting of plastics, ferrous materials, ferrous alloy materials, etc. The subject of welding is discussed in depth in the reference entitled *Ulmann's Encyclopedia of Industrial Chemistry*, 5th Edition, Vol. A 28, Barbara Elvers and Stephen Hawkins, Editors, pages 203 to 227, 1996, incorporated by reference herein.

The welding material may partially reduce the circumference of the hole. The hole diameter should be selected to take into account the effect it has on the hole circumference so that the resultant article has its intended dimensions. When two or more welds are positioned around a through hole they may optionally be symmetrically positioned. It is preferred when multiple welds are present that they be spaced about the through hole rather than congregated within a small area of the through hole. Typically, the more through hole(s) welded and the greater the lengths of the welds around the area defining a through hole the better. For example, the length of a weld may be about ⅒, ⅛, ⅐, ⅙, ⅕, ¼, ⅓, etc., of the perimeter of the through hole. The entire area defining a through hole may be welded or just a portion of the area defining the through hole such as, for example, opposite sides of the hole. Typically the total length(s) of the weld(s) is at least about 10 percent of the circumference of a through hole, more typically about 50 to about 100 percent, preferably about 75 to about 100 percent. The number of welds around a through hole may be one, two, three, four, five, six, seven, eight, etc. Although it is preferred that 100 percent of a through hole circumference be welded, this may not be done due to time and cost restraints.

When welding around the periphery of the article, frequently the welds are symmetrically positioned. The entire periphery may optionally be welded, although typically this would not be done due to the expense and time required. Typically the greater the number and lengths of the welds the better. The number of welds around the periphery may be one, two, three, four, five, six, seven, eight, nine, ten, etc. When the laminate article has corners (such as a rectangular shaped laminate article) preferably at least one weld is positioned at or in the vicinity of a corner. Preferably the distance between welds on the periphery of the laminate would be about 10 cm, preferably about 8 cm or less, more preferably 1 cm or less. Preferably weld(s) are present within at least about 2.5 cm of the apex of each corner, more preferably within at least about 2.5 cm of the apex of each corner, and most preferably at the apex of each corner, when the laminate article is designed such that it has corners. Typically the total length(s) of the weld(s) around the periphery are about 1 to about 100 percent the length of the periphery, more typically about 2.5 to about 80 percent the length of the periphery, preferably about 2.5 to about 60 percent the length of the peri phery, and most preferably about 2.5 to about 40 percent of the length of the periphery. In some situations one may choose not to symmetrically position the weld(s) about the periphery of a laminate article. For example, the laminate articles coming off a press may have been observed for a long enough time to discover that only a certain corner of the laminate article, for example, springs apart over time. In such a case one may choose to weld at or in the vicinity of the corner which has the tendency, if not modified, to spring apart.

When welding through holes or periphery areas it is not necessary to weld the through hole area or periphery such that no vibration damping material is exposed. However, by doing so one can even further minimize or eliminate fluid from seeping into the vibration damping material through the through hole area or periphery area when the laminate is being ultrasonically cleaned, for example.

The present invention can be better understood by referring to FIGS. 1–13.

FIG. 1 is a top view of a disk drive showing disk drive cover 6 of the invention wherein a vibration damping material laminate is the cover construction material. The attachment devices (screws) are indicated by reference numerals 11. The different through holes are identified as 1, 2, 3, 4, 7, 8, 21, and 23.

Figure 2:
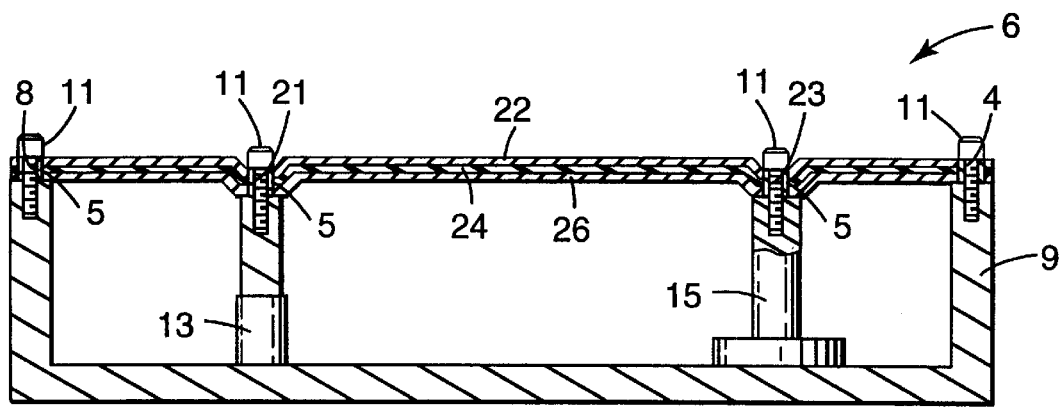
FIG. 2 is a cross-section of the disk drive taken along line 2—2 in FIG. 1.

FIG. 2 is a cross-section of the disk drive taken along line 2–2 of FIG. 1. The cross-section shows the screws 11 holding the cover 6 of the invention in the desired location. This cover 6 uses screw type fasteners 11 that apply an attachment force to the cover 6 and the base 9 that the cover 6 is attached to via the screws 11. The screws 11 also connect and locate the top cover 6 and the spindle 13 of the disk drive (the unit that rotates the disks so that a read/write head can be located over the data on the disk) and actuator 15 (the unit that moves the read/write head in a horizontal motion across the disks to provide access to different radii of the disk where data is written or stored). For clarity, the disk assembly and read/write heads and arms assembly that extend over the disks have been removed. This figure shows the cover comprises upper and lower substrate layers 22 and 26, respectively, vibration damping material layer 24, through holes 8, 21, 23, and 4 and welds 5 around the area of the laminate defining the through holes.

Figure 3:
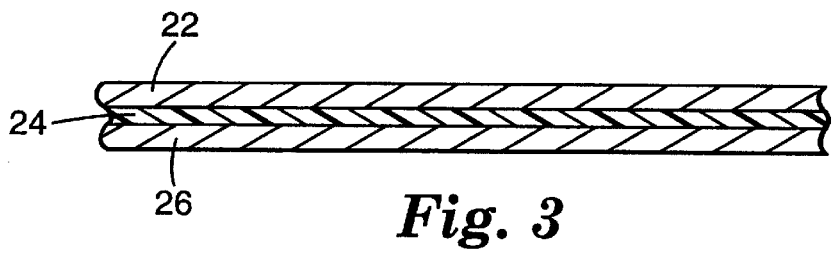
FIG. 3 is a partial cross-section of the top of the disk drive taken along line 3—3 of FIG. 1.

FIG. 3 is a partial cross-section of the disk drive cover 6 of the invention taken along line 3–3 of FIG. 1. The cross section shows a laminate of upper substrate layer 22, lower substrate layer 26, and vibration damping material layer 24 bonded therebetween.

Figure 4:
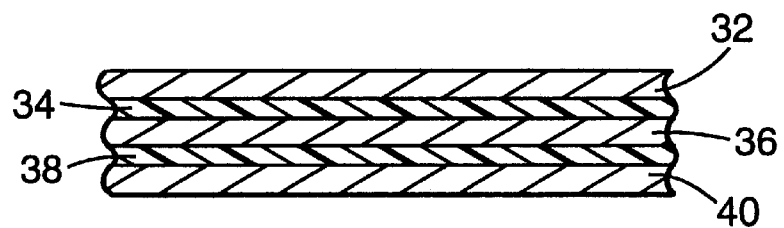
FIG. 4 is a second embodiment of a partial cross-section of the top of the disk drive taken along line 3—3 of FIG. 1.

FIG. 4 is a second embodiment of a partial cross-section of the disk drive cover of the invention taken along line 3—3 of FIG. 1. The cross-section shows the substrate layers 32, 36 and 40 and vibration damping layers 34 and 38.

Figure 5:
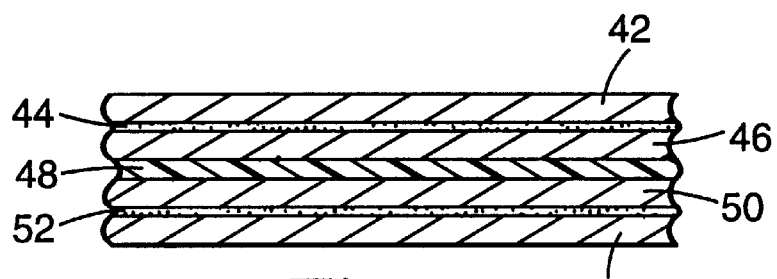
FIG. 5 is a third embodiment of a partial cross-section of the top of the disk drive taken along line 3—3 of FIG. 1.

FIG. 5 is a third embodiment of a partial cross-section of the disk drive cover of the invention taken along line 3—3 of FIG. 1. The cross-section shows the substrate layers 42, 46, 50 and 54, vibration damping layer 48, and bonding material layers 44 and 52 (such as epoxy resins) all bonded together in a laminate.

Figure 6:
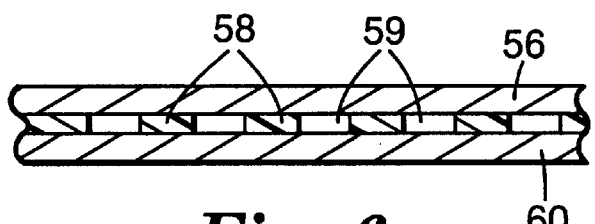
FIG. 6 is a fourth embodiment of a partial cross-section of the top of the disk drive taken along line 3—3 of FIG. 1.

FIG. 6 is a fourth embodiment of a partial cross-section of the disk drive cover of the invention taken along line 3—3 of FIG. 1. The cross-section shows the substrate layers 56 and 60, sections of vibration damping material 58 and spaces 59 and/or nonvibration damping material therebetween.

Figure 7:
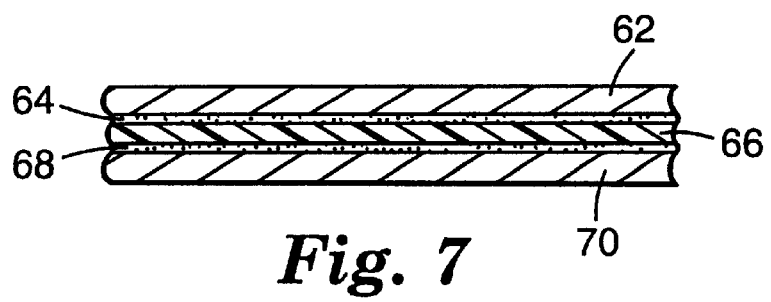
FIG. 7 is a fifth embodiment of a partial cross-section of the top of the disk drive taken along line 3—3 of FIG. 1.

FIG. 7 is a fifth embodiment of a partial cross-section of the top of the disk drive taken along line 3—3 of FIG. 1. The cross-section shows the substrate layers 62 and 70, vibration damping material layer 66, and bonding material layers (such as epoxy resins) 64 and 68 all bonded together to form a laminate.

Figure 8:
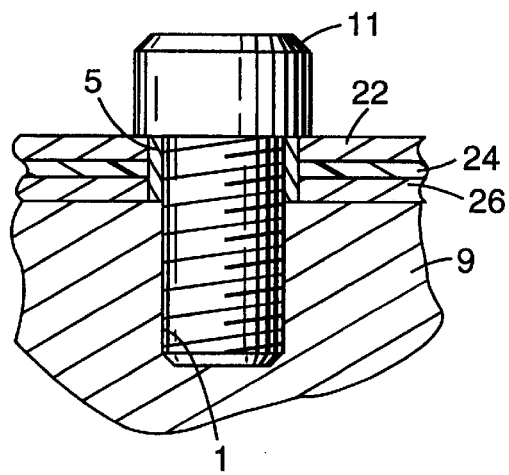
FIG. 8 is a partial cross-section of the top of the disk drive taken along line 8—8, FIG. 1.

FIG. 8 is a partial cross-sectional view of line 8—8 of FIG. 1. The cross-section shows the laminate comprising upper substrate layer 22, lower substrate layer 26, and vibration damping layer 24 and the attachment device (screw) 11 securing the laminate to the base 9. Welds 5 which surround the area of the laminate defining the through hole 1 serve to weld the upper substrate layer 22 to the lower substrate layer 26. The welds 5 provide improved force retention characteristics.

Figure 9:
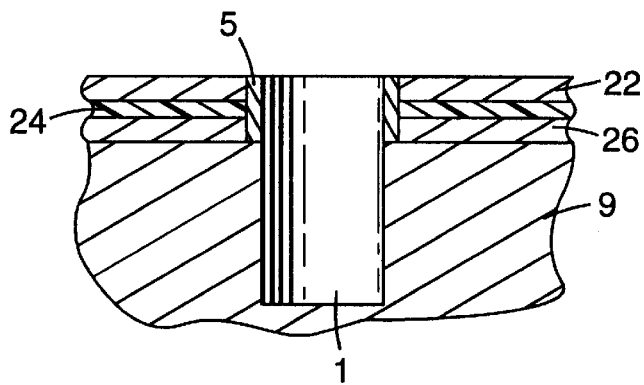
FIG. 9 is a partial cross-section of the top of the disk drive with the present invention.

FIG. 9 is a schematic cross-sectional view of line 8—8 of FIG. 1, but with the screw 11 removed.

Figure 10:
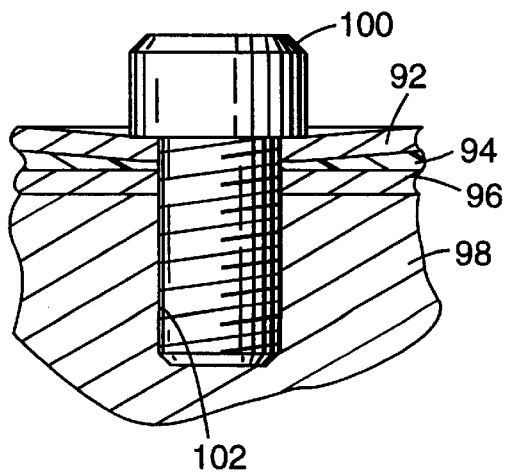
FIG. 10 is a partial cross-section of a prior art laminate article having an attachment device inserted in a through hole immediately after insertion.
Figure 11:
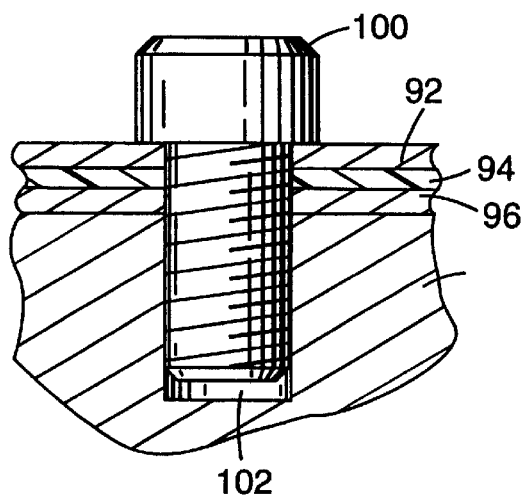
FIG. 11 is a prior art laminate and attachment device of FIG. 10 after a period of time has elapsed.

FIG. 10 is a partial cross-sectional view of a prior art laminate having an attachment device 100 inserted into a through-hole 102. The cross-section shows a laminate comprising upper substrate layer 92, lower substrate layer 96, and vibration damping layer 94 and the attachment device (screw) 100 securing the laminate to the base 98. The laminate of FIG. 10 does not have the substrate layers 92 and 96 welded around the through hole to have improved force retention characteristics. Due to the lack of welds, the substrate layer 92 and 96 are forced together upon insertion of the screw 100. Since the substrate layers are not welded or otherwise permanently forced together their tendency is to return to their original positions as shown in FIG. 11, after a period of time, resulting in a loosening of the screws 100.

Figure 12:
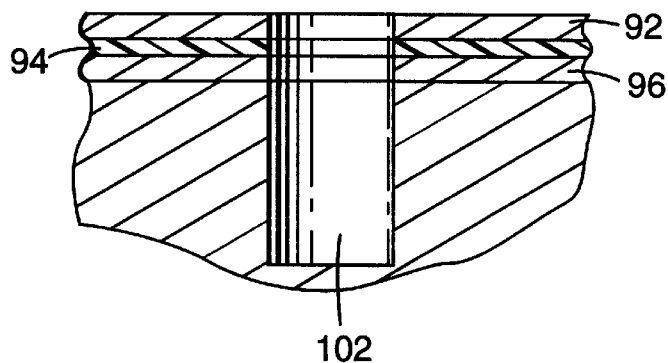
FIG. 12 is a prior art laminate article of FIG. 10 wherein the attachment device and base is not shown.

FIG. 12 is identical to FIG. 10, but with the screws 100 removed from the laminate article.

Figure 13:
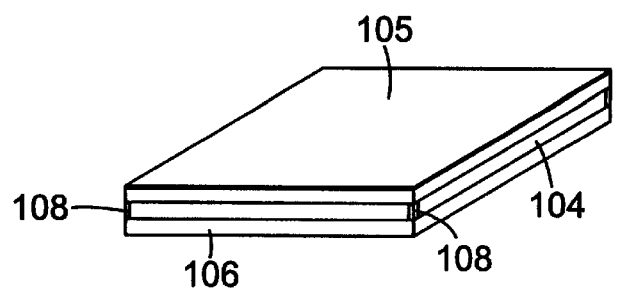
FIG. 13 is a laminate article of the present invention having welds at four corners of the article.

FIG. 13 is a laminate article of the invention comprising substrate layers 105 and 106 and inner vibration damping material layer 104. The substrate layers 105 and 106 are joined at four corners via welds 108.

Tooling and Method of the Invention

The damped laminate article of the invention is typically made by a method wherein at least a portion of the first and second substrate layers are welded together in an area surrounding a through hole(s) and/or around the periphery of the article. In some situations these welds may be in an intended attachment area to provide improved force retention of the attachment device as compared to a similar laminate that does not have such welds that serve to bridge the damping material in the same area. Typically the laminate article is usefully welded when the torque retention is at least about 10 percent improved over a similar nonmodified laminate article which has not been welded, preferably greater than about 20 percent improved, and most preferably greater than about 30 percent improved, and optimally greater than about 35 percent improved, as determined via "General Torque Retention Test Method" set forth herein. The General Torque Retention Test Method relates to the force retention of an attachment device in an attachment area at least partially contacting a welded area.

The welding of the substrate layer(s) limits or eliminates the residual spring effect of the substrates, prevents/reduces vibration damping material compression and recovery, and reduces dynamic friction losses during fastener device application.

The present invention provides an improvement in the force retention of an attachment device (such as a screw, bolt, nail, rivet, etc.) that would be inserted into a welded through hole plus attachment devices that can attached over, surrounding, or adjacent the welded through hole area and/or welded edge of the periphery and take advantage of the force retention (such as a clamp).

As discussed previously, the laminate article may optionally be stamped or otherwise plastically deformed prior to welding. If space remains between the substrate layers after the desired laminate article is formed, the welding of the through holes and/or periphery can provide force retention benefits.

For example, the substrate layers may be plastically deformed in the intended fastener area (through hole or periphery) by means of applying pressure to at least one outer substrate layer. The substrate layers may take on a permanent set (plastic deformation) from the force or pressure. If this is done in a manner which does not displace all or a significant amount of damping material (as in U.S. Pat. No. 5,691,037) a laminate article may still have a significant residual spring force between the laminate substrate layers. The attachment device would need to bring together the substrate layers and overcome the residual spring force that could still exist following the permanent displacement of the damping material. Also if a substrate layer is not sufficiently plastically deformed, it can recover back to a portion of its pre-deformation position. This can create a spacing between substrate layers and a residual spring force. When the attachment device is attached in this area, this residual spring force can reduce the force retention of the attachment device as the initial force used to apply the attachment device is used to overcome the residual spring force in the substrate layers versus a force being used to overcome frictional losses or other mechanical impediments to the fastener device, thus potentially reducing the overall force retention once the system stress relaxes.

The welding is done in manner which eliminates or minimizes the amount of elastic recovery of the vibration damping material and also to limit the residual spring force between substrate layers.

Although a laminate article can be made by a process which involves combining substrate layers with an internal vibration damping layer without plastic deformation of the substrate layers, a laminate article is typically prepared from a larger laminate (such as a roll or sheet) from which the laminate article is stamped, thus involving plastic deformation of the substrate layers.

The method of the invention typically involves applying a vibration damping material by coating, spraying, silk screening, casting, or laminating etc., onto a substrate layer. The vibration damping material layer can be continuous, or discontinuous. The vibration damping material may substantially form a layer having about the same dimensions as the substrate layers between which it is sandwiched. Alternately, the layer may be of more limited dimensions and may be situated in an area of greatest vibrational stresses. Typically, an amount of the damping material is present such that the damping characteristics of the article are improved over a non-laminate or monolithic article. Preferably, a sufficient amount of the vibration damping material is used such that the damping is improved by at least about 10% in at least one vibrational mode.

An opposite substrate layer is applied over the damping material creating a laminate material construction. Additional damping layers and substrate layers can be added. The laminate material can then be fed or placed into stamping or forming equipment (with associated dies, etc.) to produce a laminate article. In specific reference to the intended attachment areas of the article, a damped laminate article can optionally have one or more through hole(s) pierced or cut through the entire laminate article by conventional means such as a standard punch, laser, water jetstream, etc., to accommodate the attachment device. A through hole can be of a wide variety of shapes. It can be circular, elliptical, square, rectangular, octagonal, star-shaped, etc. It can be symmetrical or asymmetrical. The size of a through hole will vary depending upon the intended use of the laminate article of the invention. Typically a through hole will have a diameter of about 0.1 inch to about 2 inches (about 0.25 to about 5.1 cm), more typically about 1 mm to about 10 mm. Indentations may also be provided in the article with a punch tool for example. An indentation may surround a through hole, for example, so a screw or the attachment device does not project high above the laminate article.

As mentioned previously through holes and/or indentations in the laminate article can be formed via punch tools. Punch tools have working surface(s). The working surface is that part of the punch tool that comes into contact with the laminate during the usage of the punch tool. Tools used to provide indentations in the laminate are typically mounted in a stamping press that engages the tool to the laminate surface(s) and applies the force to deform the substrate layer(s). Some tools or punches used to pierce holes, emboss, or coin areas of the laminate will have similar tool features, but are designed to accomplish different functions in making the laminated article. One skilled in the art would be able to select an appropriate device such as a punch tool to provide a through hole.

The tool design is based on the substrate materials used, through hole size, thickness of the laminate, thickness of each layer in a laminate, vibration damping material used, and layer types in the laminate. The punches may also require a different grade of tool steel to enhance the tool life than may typically be used for other punch type processes on the laminate (for example, embossing or coining). The text handbook of metal forming (McGraw-Hill, Inc. Lange, ISBN 0-07-036285-8) gives a good overview of stamping processes and equipment in general.

After the laminate article is formed, welding can take place in order to form the laminate article of the invention. An area(s) of the article defining a through hole(s) can be welded such that the first substrate is welded to the second substrate. Alternatively and/or in addition at least a portion of the laminate article periphery is welded such that the first substrate layer is welded to the second substrate layer. When an area of the article defining a through hole is welded, the initial through hole diameter can be selected to be larger than the desired final through hole diameter, if it is determined that the welding process will most likely cause a decrease in the through hole diameter to yield a final desired article having the desired through hole diameter. The substrate layer(s) are welded such that they do not impart a resistive or spring force against an attachment device when applied.

The laminate article of the invention provides improved fastener force retention upon application to provide an optimized damped laminate article. Thus, the articles of the present invention are good candidates for products that require vibration and shock resistance and control, reduced noise generation and transmission, along with improved force retention of an attachment device that is used to hold the laminate article of the invention in place.

The laminate article of the invention having improved fastener force retention and decreased or eliminated spring back can be made by first providing a conventional damped laminate by any suitable technique for creating articles as understood by those in the industry the article is being used and subsequently welding the article according to the present invention. For example, a cover for a disk drive application can be made by adding a single layer of a vibration damping material 0.05 mm thick near the center of the cover by laminating a layer of stainless steel with a layer of suitable viscoelastic damping material and an additional layer of stainless steel. This laminate may then be stamped with various tools and dies that provide the needed part definition (embossing, blanking, forming, coining, etc.) as discussed in the previously mentioned text handbook of metal forming. The final laminated cover during this stamping process may have holes pierced in it to provide a path for the fastener devices (such as screws, for example) to hold the cover securely to the base (and to other components, such as an acuator and spindle motor, if desired). The through hole areas and/or periphery of the article are welded to minimize or eliminate residual spring effect between the stainless steel layers and to feature the attachment area such that dynamic friction is reduced, to provide a laminated disk drive cover with improved force retention as compared to laminated covers not so welded.

Examples of laminate articles of the invention which may be produced with reduced or nonexistent spring back and improved force retention characteristics include but are not limited to those selected from the group consisting of covers, panels, housings, baffles, pans, containers, and ducts and other applications where conventional methods to improve the force retention of the fastener system in a laminated article are not practical, cost effective, sufficiently effective to meet design goals or are limited by initial force that can be used to apply the fastener system. Example of specific articles include but are not limited to those selected from the group consisting of vehicle oil pan covers, disk drive covers, vehicle valve covers, appliance panels, vehicle panels, acoustical panels, laminated sheeting panels, building panels, heating panels, ventilation panels, air conditioning panels, motor housings, appliance housing, equipment housings, fluid baffles, acoustical baffles, vehicle oil pans, shipping containers, holding containers, storage containers, transportation containers, heating ducts, ventilation ducts, air conditioning ducts and cooling ducts.

General Torque Retention Test Method

The torque retention test measures the retained force of an attachment device after the device has been applied to the laminate in the desired test areas. The laminate has the test method attachment device applied and the assembly is allowed to set for a prescribed period of time (24±1 hour) and at room temperature (about 18.5 to about 24° C. (65 to about 750° F.)).

A test to determine the benefit of the invention in a laminate article is conducted as follows:

1) Select the laminate to be tested.

2) Select a screw and associated sample base that has a tapped hole for the screw to be screwed into. The screw should be the same or equivalent as used in the end use application.

The default screw material is stainless steel and the default base material is aluminum. The default screw shaft should fit through the through hole in the laminate. The screw shaft diameter should be at least 20% of the hole area and the screw head sized to support the strength required to support the torque applied to it and to contact an area at least 5.0% the size of the hole, surrounding the hole.

For laminates welded about the periphery a clamp versus a screw attachment device can be used to conduct the test. The clamp should have a contact area to the substrate of at least 0.5 cm². The clamp device is of a "C" design with the force applied in a perpendicular extension to the laminate surface. The extension is a screw type extension so that a torque driver can be used to apply the clamp force.

3) Apply the screw type or clamp type attachment device to the laminate and the base. The default temperature and humidity is 65–75° F. (about 18.5 to about 24° C.) and 30–70% relative humidity. Use clean screws and clean surfaces for the test. (No oil or lubricants should be present on the surface) A screw or clamp is torqued to at least about 20 pounds-inch (lb in) [(2.26 Newton meters (N·m)] to apply a holding pressure between the screw head or clamp and laminate which in turn held the laminate securely to the base. A HDP-50 Hios torque driver, with maximum readout of 45 may, for example, be used.

4) The laminate cover and base assembly following torquing is allowed to sit at room temperature (70° F., 21° C.) for 24±1 hours to allow the relaxation of the screw and the cover to occur.

5) After the 24±1 relaxation period was complete, the force to undo the screw or clamp was measured by using the torque driver in the opposite direction. The break or maximum force required to begin turning the screw or clamp extension to remove it is recorded.

6) The maximum torque force required to remove the screws or clamps from the laminate sample is compared to the initial force.

EXAMPLES

The invention has been described with reference to various specific and preferred embodiments and will be further described by reference to the following detailed Examples. It is understood, however, that there are many extensions, variations, and modifications on the basic theme of the present invention beyond that shown in the examples and detailed description, which are within the spirit and scope of the present invention. All parts, percentages, ratios, etc., in the Specification and the Examples are by weight unless indicated otherwise.

Description of Sample

The disk drive cover is one of many parts of a disk drive. The cover fits onto a base or housing that other components of the disk drive are set into. The cover has eight pierced holes, of which six are found on the outer edges of the cover. One hole is present at each of the four corners of the roughly 4 inches×6 inches (10 cm×15 cm) metric cover. The other two holes are found near the edge of the mid-point of the long side of the cover.

For the purpose of demonstrating the invention, an acrylic damping material was used to prepare a damped disk drive cover. The damping material used was an acrylic polymer that had a loss factor greater than 0.5 for a broad frequency range (+/−1000 Hz) at the desired test temperature (20° C./72° F.). The acrylic damping polymer selected was 3M ISD-112, SJ2015 type 1202 available from Minnesota Mining and Manufacturing Company, St. Paul, Minn.). The damping material was placed as an inner layer of a stainless steel damped laminate construction. This laminate construction was then processed through a stamping operation to produce a completed damped disk drive cover as described below.

Covers 1 and 2

Covers 1 and 2 of the present invention were prepared in an identical manner. A 0.025 mm (0.001 inch) thick sheet of acrylic polymer damping material (3M ISD-112) was placed (laminated) between layers of stainless steel [one 0.016 inch (0.4 mm) and the other 0.024 inch, (0.6 mm thick)] at ambient conditions (about 21° C. (70° F.) and about 35% relative humidity). The damping material was laminated onto the initial stainless steel layer and the second stainless steel layer was added onto the damping material to create a laminate construction. The damping material selected had room temperature pressure sensitive bonding characteristics, so no heat and only modest pressure with a rubber roller was required to create the laminate material. The damped laminate material was then processed through several stamping operations to form a completed article, a disk drive damped laminate cover as shown in FIG. 1.

The laminate input material was initially put into a mechanical press that can apply significant pressure to the laminate material as it is positioned between a die and punch set-up. Press tonnage was typically 50 tons (4.54×10⁴ kg) or more. The die and punch set-up are designed as to impart a particular feature into the laminate material. The basic process steps for the damped laminate cover of the Covers 1 and 2 included operations to emboss the cover (displace the laminate material to 2 or more horizontal levels), pierce the cover to add through holes for screws, star punch the through holes, and final blank or cut the cover out from the excess laminate material. The acrylic polymer sheet completely covered the inner surface of each cover article.

There were six screw through holes on each cover near the perimeter of the cover. These screw through holes were numbered from 1, 2, 3, 4, 7, and 8. The through holes were 0.132–0.141 inches (3.35–3.58 mm) in diameter. Through holes 4 and 6 were welded such that the two stainless steel layers were welded together. Each weld had a length approximately equal to the perimeter of the hole.

Cover 3

Cover 3 was prepared according to the procedure of Covers 1 and 2 except that there was only one stainless steel layer [0.024 inch (0.6 mm) thick], no damping material, and no welded through holes.

Torque Test Method and Set-up

The covers 1, 2, and 3 were all tested in the same test set-up and method.

The covers were tested as follows:

1) The six holes of the cover were aligned with tapped holes in a 35.5 cm long×25.4 cm wide×0.635 cm thick (14 inches×10 inches×0.25 inches) aluminum base.

2) Screws were placed in each of the numbered outer holes of the cover and into the base's tapped holes and lightly tightened. The attachment screws were #4–40 stainless steel with a shaft diameter of 0.114–0.118 inches (2.9–3 mm) and a head diameter of 0.216–0.224 inches (5.5–5.7 mm).

3) The screws were torqued to approximately 20 pounds-inch (lb in.) (2.6 Newtons-meter (N·m) to apply a holding pressure [Torque In] (T(I)) between the screw head and cover which in turn held the cover securely to the base. A HDP-50 Hios torque driver, with maximum readout of 45, was used.

4) The laminate cover and base assembly following torquing was allowed to sit at room temperature (about 70° F., 21° C. and about 35% relative humidity) for 24±1 hours to allow the relaxation of the screw and the cover to occur.

5) After the relaxation time was complete, the force to undo the screw the "Torque Out" [(T(O)] was measured by using the torque driver in the opposite direction. The break or maximum force required to begin turning the screw to remove it was recorded and the data was used to assess the benefit of the invention as compared to a through-hole without the weld.

The torque data for each of the six screw/through-holes of Covers 1, 2, and 3 is found in Table 1.

TABLE 1

| Cover No. | Hole No. | Torque In T(I) N·m (lb in) | Torque Out T(O) N·m (lb in) | Percent Torque Retention T(O)/T(I) × 100 |
|---|---|---|---|---|
| Cover 1 | 1 | 2.27 (20.1) | 0.99 (8.8) | 44 |
| | 2 | 2.18 (19.3) | 0.85 (7.5) | 39 |
| | 3 | 2.29 (20.3) | 1.03 (9.1) | 45 |
| | 4 (welded) | 2.20 (19.5) | 1.37 (12.1) | 62 |
| | 5 | 2.18 (19.3) | 0.96 (8.5) | 44 |
| | 6 (welded) | 2.30 (20.4) | 1.48 (13.1) | 64 |
| Cover 2 | 1 | 2.26 (20.0) | 0.91 (8.1) | 41 |
| | 2 | 2.35 (20.8) | 0.91 (8.1) | 39 |
| | 3 | 2.24 (19.8) | 1.24 (11.0) | 56 |
| | 4 (welded) | 2.24 (19.8) | 1.39 (12.3) | 62 |
| | 5 | 2.33 (20.6) | 1.15 (10.2) | 50 |
| | 6 (welded) | 2.28 (20.2) | 1.47 (13.0) | 64 |
| Cover 3 | 1 | 2.31 (20.5) | 1.42 (12.6) | 61 |
| | 2 | 2.09 (18.5) | 1.31 (11.6) | 63 |
| | 3 | 2.17 (19.2) | 1.32 (11.7) | 61 |
| | 4 | 1.99 (17.6) | 1.29 (11.4) | 65 |
| | 5 | 1.99 (17.6) | 1.13 (10.0) | 57 |
| | 6 | 2.31 (20.5) | 1.48 (13.1) | 64 |

From the data in Table 1, it can be seen that sections of covers having welded through-holes have significantly improved percent torque retention as compared to sections of covers having through-holes without welds and approximately equal percent torque retention as plain metal.

The foregoing detailed description and Examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A laminate article comprising:
   a first substrate layer and a second substrate layer;
   at least one layer of vibration damping material comprising a viscoelastic material positioned between said first and second substrate layers;
   optionally one or more additional substrate layers positioned between said first and second substrate layers;
   optionally one or more bonding material layers bonded between a substrate layer and a vibration damping layer, wherein the storage modulus of each bonding material layer is higher than the storage modulus of the viscoelastic material contained in a vibration damping layer to which it is bonded;
   wherein the storage modulus of each substrate layer is greater than that of the viscoelastic material in any vibration damping material layer with which it is in contact;
   wherein the laminate article has at least one through hole extending completely therethrough, wherein an area of the article which defines at least one through hole is welded via weld(s) such that the first substrate layer is welded to the second substrate layer at the through hole.

2. The laminate article of claim 1, wherein for at least one through hole the through hole has a circumference, wherein each weld has a length, and wherein the area defining the through hole is welded such that the total length(s) of the weld(s) is about 50 to about 100 percent of the length of the circumference of the through hole.

3. The laminate article of claim 1, wherein for at least one through hole the through hole has a circumference, wherein each weld has a length, and wherein the area defining the through hole is welded such that the total length(s) of the weld(s) is about 75 to about 100 percent of the length of the circumference of the through hole.

4. The laminate article of claim 1, wherein for at least one through hole the through hole has a circumference, wherein each weld has a length, and wherein the area defining the through hole is welded such that the total length(s) of the weld(s) is about 100 percent of the length of the circumference of the through hole.

5. The laminate article of claim 1 wherein the laminate article has multiple through holes extending completely therethrough, wherein the area of the article which defines each through hole is welded such that the first substrate layer is welded to the second substrate layer.

6. The laminate article of claim 1 wherein for at least one through hole more than one weld is present in an area defining the through hole and wherein the welds are symmetrically positioned about the area defining the through hole.

7. The laminate article of claim 1 wherein for at least one through hole which has the area of the article defining the through hole welded, the through hole has a diameter of about 0.12 cm to about 3.5 cm.

8. The laminate article of claim 1 wherein each through hole has a diameter of about 1 mm to about 10 mm.

9. The laminate article of claim 1 wherein at least a portion of the laminate article periphery is welded such that the first substrate is welded to the second substrate.

10. The laminate article of claim 1 wherein the substrate layers are selected from the group consisting of metals and plastics.

11. The laminate article of claim 1 wherein the substrate layers are selected from the group consisting of stainless steel, aluminum, copper, carbon steel, lead, polyethylenes, polyolefins, polycarbonates, polyesters, polyimides, polystyrenes, polyacetates, vinyl copolymers, polyacetals, and phenolics.

12. The laminate article of claim 1 wherein the bonding material layer is selected from the group consisting of epoxy resins and cyanoacrylates, polyamides, acrylics, phenoxies, and phenolics.

13. The laminate article of claim 1 having at least one layer of vibration damping material contained therein, said vibration damping material comprising a viscoelastic material, said vibration damping material having a loss factor of at least about 0.01 and a storage modulus of at least about $6.9 \times 10^3$ Pascals.

14. The laminate article of claim 1 wherein the vibration damping material is a viscoelastic material selected from the group consisting of thermoplastic polymers, thermosetting polymers, and mixtures thereof.

15. The laminate article of claim 14 wherein the thermosetting polymer is an acrylate.

16. The laminate article of claim 1 selected from the group consisting of covers, panels, casings, housings, baffles, pans, containers, and ducts.

17. The laminate article of claim 1 selected from the group consisting of vehicle oil pan covers, disk drive covers, engine covers, vehicle valve covers, appliance panels, vehicle panels, acoustical panels, laminated sheeting panels, building panels, aerospace panels, heating panels, ventilation panels, air conditioning panels, motor housings, appliance housing, equipment housings, fluid baffles, acoustical baffles, vehicle oil pans, shipping containers, holding containers, storage containers, transportation containers, heating ducts, ventilation ducts, air conditioning ducts and cooling ducts.

18. The laminate article of claim 1 wherein said article contains at least two layers of vibration damping material and at least three substrate layers.

19. The laminate article of claim 1 wherein at least one vibration damping material layer further comprises an additive selected from the group consisting of fibers, particulates, and mixtures thereof.

20. The laminate article of claim 1 wherein the vibration damping is improved by at least about 10% over a monolithic article in at least 1 vibrational mode.

21. The laminate article of claim 1 wherein the vibration damping layer is a continuous layer.

22. The laminate article of claim 1 wherein the vibration damping layer is a continuous layer made up of adjacent sections of different vibration damping materials.

23. The laminate article of claim 1 wherein the article contains at least 2 layers of vibration damping material, wherein at least 2 of the layers comprise different damping materials.

24. The laminate article of claim 1 wherein the vibration damping layer is a discontinuous layer.

25. The laminate article of claim 24 wherein the discontinuous layer comprises sections of damping material separated by non-damping material or spaces.

26. A fastening assembly comprising the laminate article of claim 1 and at least one attachment device positioned thereon, wherein at least one attachment device at least partially contacts at least one of the welded areas of the article surrounding at least one through hole.

27. The fastening assembly of claim 26 wherein the attachment device is selected from the group consisting of screws, bolts, clamps, nails and rivets.

28. The fastening assembly of claim 27 wherein the attachment device is selected from the group consisting of screws, bolts, nails, and rivets and the attachment device is inserted through the through hole.

29. A fastened assembly comprising the laminate article of claim 1 fastened to a second article via an attachment device, wherein at least one attachment device at least partially contacts a weld.

30. A method of preparing a laminate article comprising the steps of:
  (a) preparing a laminate article comprising at least one layer of vibration damping material, the vibration damping material comprising a viscoelastic material, wherein the vibration damping material is positioned between a first substrate layer and a second substrate layer, and optionally one or more additional substrate layers positioned between said first and second substrate layers wherein each substrate layer has a higher storage modulus than the viscoelastic material in any vibration damping material layer with which it is in contact, optionally 1 or more bonding material layers bonded between a substrate layer and a vibration damping layer, wherein the storage modulus of each bonding material layer is higher than the storage modulus of the viscoelastic material contained in a vibration damping layer to which it is bonded; and
  (b) providing at least one through hole in the laminate article;
  (c) welding an area of the laminate article defining at least one through hole, such that the first substrate layer is welded to the second substrate layer via weld(s) at the through hole, wherein force is optionally applied to the laminate article during welding such that the layers of the laminate article are in a desired position.

31. A method of preparing a laminate article comprising the steps of:
  (a) preparing a laminate comprising at least one layer of vibration damping material, the vibration damping material comprising a viscoelastic material, wherein the vibration damping material is positioned between a first substrate layer and a second substrate layer, and optionally one or more additional substrate layers positioned between said first and second substrate layers wherein each substrate layer has a higher storage modulus than the viscoelastic material in any vibration damping material layer with which it is in contact, optionally 1 or more bonding material layers bonded between a substrate layer and a vibration damping layer, wherein the storage modulus of each bonding material layer is higher than the storage modulus of the viscoelastic material contained in a vibration damping layer to which it is bonded; and
  (b) stamping a laminate article out of the laminate wherein the laminate article has at least one through hole therein;
  (c) welding an area of the laminate article defining at least one through hole, such that the first substrate layer is welded to the second substrate layer via weld(s) at the through hole, wherein force is applied to the laminate during welding to maintain the substrate layers in a parallel position.

* * * * *